United States Patent
Gao (10) Patent No.: US 12,164,824 B2
(45) Date of Patent: Dec. 10, 2024

(54) INTERACTIVE PROJECTION INPUT AND OUTPUT DEVICE

(71) Applicant: Yong Gao, Shanghai (CN)

(72) Inventor: Yong Gao, Shanghai (CN)

( * ) Notice: Subject to any disclaimer, the term of this patent is extended or adjusted under 35 U.S.C. 154(b) by 0 days.

(21) Appl. No.: 18/041,566

(22) PCT Filed: Dec. 6, 2021

(86) PCT No.: PCT/CN2021/135738
§ 371 (c)(1),
(2) Date: Feb. 14, 2023

(87) PCT Pub. No.: WO2022/127634
PCT Pub. Date: Jun. 23, 2022

(65) Prior Publication Data
US 2023/0297312 A1 Sep. 21, 2023

(30) Foreign Application Priority Data
Dec. 16, 2020 (CN) .......................... 202011488192.7

(51) Int. Cl.
*G06F 3/03* (2006.01)
*G03B 21/26* (2006.01)
(Continued)

(52) U.S. Cl.
CPC ............ *G06F 3/1454* (2013.01); *G06F 3/042* (2013.01)

(58) Field of Classification Search
CPC .................................................... G06F 3/0425
See application file for complete search history.

(56) References Cited

U.S. PATENT DOCUMENTS

| 3,541,541 A | 11/1970 | Engelbart |
| 4,071,910 A | 1/1978 | Stockebrand et al. |

(Continued)

FOREIGN PATENT DOCUMENTS

| CN | 201251858 | 6/2009 |
| CN | 102478999 A | 5/2012 |

(Continued)

OTHER PUBLICATIONS

"Lumi smart projection table lamp with infrared touch interaction technology", Globe, Dec. 22, 2019, 12 pages. (With brief English explanation).

(Continued)

*Primary Examiner* — Nan-Ying Yang
(74) *Attorney, Agent, or Firm* — Getech Law LLC; Jun Ye (57) ABSTRACT

The present disclosure relates to an interactive projection input and output device, which includes: a projecting module, configured to display a screen mirroring content from an external device in a projection region of a projection picture corresponding to the external device; a coordinated operation capturing module, configured to: determine a first coordinate of a user coordinated operation point corresponding to a user coordinated operation behavior in a first coordinate system; a coordinated instruction generating module, configured to, generate a position information instruction according to the first coordinate of the user coordinated operation point and regional position information of the projection region in the first coordinate system; and a wireless transmission module, configured to receive screen mirroring information from the external device, and send the position information instruction to the external device, so as to operate the external device.

15 Claims, 3 Drawing Sheets

(51) Int. Cl.
  *G06F 3/042*     (2006.01)
  *G06F 3/14*      (2006.01)

(56)       References Cited

U.S. PATENT DOCUMENTS

| 9,996,972 | B1 | 6/2018 | Worley, III et al. |
| 10,168,041 | B2 | 1/2019 | Dyson et al. |
| 2009/0254953 | A1* | 10/2009 | Lin ................ H04N 21/42204 725/93 |
| 2011/0002020 | A1* | 1/2011 | Khan ...................... G03H 1/30 359/22 |
| 2011/0197147 | A1 | 8/2011 | Fai |
| 2013/0106908 | A1 | 5/2013 | Ichieda |
| 2014/0009450 | A1* | 1/2014 | Su ........................... G09G 3/20 345/204 |
| 2016/0328021 | A1 | 11/2016 | Lee et al. |
| 2016/0363774 | A1 | 12/2016 | Kawasima |
| 2018/0011586 | A1 | 1/2018 | Zhang et al. |
| 2018/0286299 | A1* | 10/2018 | Yang ................... H10K 59/351 |
| 2021/0011367 | A1* | 1/2021 | Yang ................... H04N 9/3194 |

FOREIGN PATENT DOCUMENTS

| CN | 104199548 A | 12/2014 |
| CN | 106371586 A | 2/2017 |
| CN | 106954323 A | 7/2017 |
| CN | 206339909 U | 7/2017 |
| CN | 107632744 A | 1/2018 |
| CN | 206946458 U | 1/2018 |
| CN | 207262127 U | 4/2018 |
| CN | 108269288 A | 7/2018 |
| CN | 108287597 A | 7/2018 |
| CN | 110837322 A | 2/2020 |
| CN | 111047925 A | 4/2020 |
| JP | 2001134253 A | 5/2001 |
| JP | 2006313979 A | 11/2006 |
| JP | 2017111164 A | 6/2017 |
| TW | 201812609 A | 4/2018 |
| TW | 201939291 A | 10/2019 |
| WO | 2015078020 A1 | 6/2015 |
| WO | 2018001342 A1 | 1/2018 |

OTHER PUBLICATIONS

CN202023045169.9—Decision of Rejection mailed on Sep. 7, 2021, 4 pages.
CN202023045169.9—First Office Action mailed on Jun. 10, 2021, 2 pages.
PCT/CN2021/135738—International Search Report and Written Opinion mailed on Mar. 4, 2022, 8 pages.
TW110146142—Office Action mailed on Oct. 27, 2022, 21 pages.
EP21905563.9—Extended European Search Report mailed on Mar. 19, 2024, 12 pages.
CN2020114881927—First Office Action mailed on Oct. 9, 2024, 20 pages.

* cited by examiner

INTERACTIVE PROJECTION INPUT AND OUTPUT DEVICE

CROSS-REFERENCE TO RELATED APPLICATION

The present application is the U.S. national phase of PCT Application No. PCT/CN2021/135738 filed on Dec. 6, 2021, which claims priority to Chinese patent application No. 2020114881927 filed on Dec. 16, 2020, the entire content of which is incorporated herein by reference in its entirety.

TECHNICAL FIELD

The present disclosure relates to interactive projection systems, and in particular to an interactive projection input and output device.

BACKGROUND

An interactive projection system which combines mixed virtual reality technology and motion capture technology is a result of further development of the virtual reality technology, with its core technology being intelligent recognition and control system based on infrared image acquisition and infrared laser positioning. Specifically, real-time video data is captured by an infrared camera and sent to an image processing unit, and dynamic background modeling is performed in a video data stream based on a specific algorithm to separate a target from background, determine position information of the target, and convert the position information into control signals. In this way, based on the control signals, control for computers and other intelligent multimedia systems can be achieved.

For example, using an embedded laser projection technology, a touch projection device is enabled to project a virtual keyboard, and a virtual projection device is connected to a PC terminal in which a software is installed, so as to operate the PC terminal through the virtual keyboard, thereby the traditional keyboard is replaced. However, in the related arts, a virtual keyboard or a virtual mouse cannot transmit absolute coordinates, that is, a virtual touch screen cannot be implemented. Further, the traditional touch projection device has self-contained CPU and operating system and thus is not a peripheral device in a strict sense. When the touch projection device controls other external intelligent device, it is required to make sure the other external intelligent device is installed with a dedicated APP or software. Therefore, the traditional touch projection device cannot achieve general coordinated control across system and device.

SUMMARY

In order to overcome the problems existing in the related art, the present disclosure provides an interactive projection input and output device.

The interactive projection input and output device includes: a projecting module, configured to display a screen mirroring content from an external device in a projection region of a projection picture corresponding to the external device; a coordinated operation capturing module, configured to: form a coordinated operation capture scope corresponding to the projection region; establish a first coordinate system within the coordinated operation capture scope; capture a user coordinated operation behavior occurring within the coordinated operation capture scope; and determine a first coordinate of a user coordinated operation point corresponding to the user coordinated operation behavior in the first coordinate system; a coordinated instruction generating module, configured to: obtain a relative position relationship between the user coordinated operation point and the projection region according to the first coordinate of the user coordinated operation point and regional position information of the projection region in the first coordinate system; and generate a position information instruction according to the relative position relationship; and a wireless transmission module, configured to: receive screen mirroring information from the external device through a downlink wireless connection, wherein the screen mirroring information comprises the screen mirroring content; and, send the position information instruction to the external device through an uplink wireless connection, such that an operating system of the external device calls an underlying drive program to execute the position information instruction, so as to achieve a control operation in response to the user coordinated operation behavior and thus operate the external device.

The technical solution provided by one or more embodiments of the present disclosure may include the following beneficial effects.

In the embodiments of the present disclosure, the screen picture to be displayed by the external device, the projection region formed by the projecting module and the coordinated operation scope formed by the coordinated operation capturing module are correlated, and the captured absolute coordinate of the user coordinated operation point is generated, through the coordinated instruction generating module, into a position information instruction identifiable by the operating system of the external device, and then the position information instruction is sent to the external device through the wireless transmission module, thereby remote control over the external device is achieved by a virtual wireless touch screen. Since the coordinated instruction generating module generates the position information instruction based on the relative position relationship between the user coordinated operation point and the projection region, and the external device may respond to the control operation corresponding to the position information instruction with the help of the underlying drive program, coordinated control can be performed on the external device without installing APP or software in the external device.

BRIEF DESCRIPTION OF THE DRAWINGS

The accompanying drawings, which are incorporated in and constitute a part of the present description, illustrate embodiments consistent with the present disclosure and serve to explain the principles of the present disclosure together with the description.

DETAILED DESCRIPTION OF THE EMBODIMENTS

Exemplary embodiments will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

The terms used in the present disclosure are for the purpose of describing particular embodiments only, and are not intended to limit the present disclosure. The terms "a", "the" and "said" of their singular forms used in the present disclosure and the appended claims are also intended to include plurality, unless clearly indicated otherwise in the context. It should also be understood that the term "and/or" as used herein refers to and includes any and all possible combinations of one or more of the associated listed items.

It is to be understood that, although the terms "first," "second," "third," and the like may be used in the present disclosure to describe various information, such information should not be limited to these terms. These terms are only used to distinguish one category of information from another. For example, without departing from the scope of the present disclosure, first information may be referred as second information; and similarly, the second information may also be referred as the first information. Depending on the context, the term "if" as used herein may be interpreted as "when" or "upon" or "in response to determining".

Detailed descriptions will be made below to the embodiments of the present disclosure.

Figure 1:
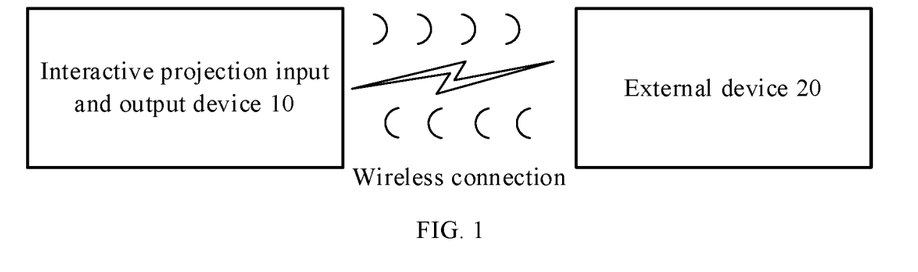
FIG. 1 is a system architecture diagram according to an embodiment of the present disclosure.

FIG. 1 is a system architecture diagram according to an embodiment of the present disclosure. As shown in FIG. 1, the system architecture includes an interactive projection input and output device 10 and an external device 20. A wireless connection is established between the interactive projection input and output device 10 and the external device 20. The external device 20 may transmit data information including screen mirroring information to the interactive projection input and output device 10 through the wireless connection, and the interactive projection input and output device 10 may also transmit data information including a position information instruction to the external device 20 through the wireless connection.

Figure 2:
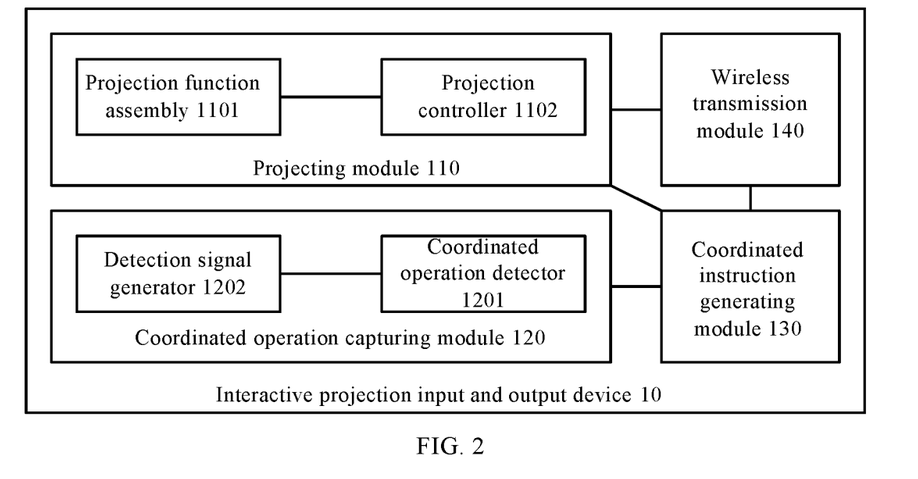
FIG. 2 is a block diagram illustrating an interactive projection input and output device according to an embodiment of the present disclosure.

FIG. 2 is a block diagram illustrating an interactive projection input and output device 10 according to an embodiment of the present disclosure. As shown in FIG. 2, the interactive projection input and output device 10 includes the following modules.

A projecting module 110 is configured to display a screen mirroring content from an external device 20 in a projection region of a projection picture corresponding to the external device 20. The screen mirroring content involved in the present disclosure refers to picture content information in the screen mirroring information, namely, information corresponding to a pixel matrix in a video frame. The projecting module involved in the present disclosure includes a projection function assembly 1101 and a projection controller 1102, where the projection function assembly 1101 includes a projection lens, an LED light source, a digital micromirror device (DMD), and a DMD drive chip to achieve basic projection functions. The projection picture involved in the present disclosure may be a virtual picture of an LED projection, a laser projection, a liquid projection, a quantum (photon) projection and the like combined by a solid state semiconductor light-emitting material together with an optical system and/or a mechanical microsystem and a heat dissipation system, on a physical plane, a physical surface or in the air (without physical bottom surface). Illustrated by the example of the physical plane, when the projecting module projects the LED light source to the physical plane through the lens, the projecting module is capable of automatically adjusting a focal length to achieve clear imaging on the physical plane, and the imaging picture on the physical plane is the projection picture. The projection region involved in the present disclosure refers to partial or whole picture region for displaying the screen mirroring content in the projection picture. Generally, based on a micromirror group allocated by the projection controller 1102 to the screen mirroring content and suitable for the screen mirroring content, the projection region in the projection picture is determined, and the screen mirroring content is projected to the projection region. In an embodiment, the projection controller 1102 may automatically determine a position, a size and a dimension of the projection region according to a video size in the screen mirroring information, for example, allocate a largest possible projection region having the same video size for the screen mirroring content on the projection picture, or allocate a projection region of any video size, any magnitude and any position, which is not limited in the embodiments of the present disclosure.

A coordinated operation capturing module 120 refers to a device module without a main board installed with an operating system and a CPU, which is configured to: form a coordinated operation capture scope corresponding to the projection region; establish a first coordinate system within the coordinated operation capture scope; capture a user coordinated operation behavior occurring within the coordinated operation capture scope; and determine a first coordinate of a user coordinated operation point corresponding to the user coordinated operation behavior within the coordinated operation capture scope in the first coordinate system and send the first coordinate to a coordinated instruction generating module 130.

Figure 3:
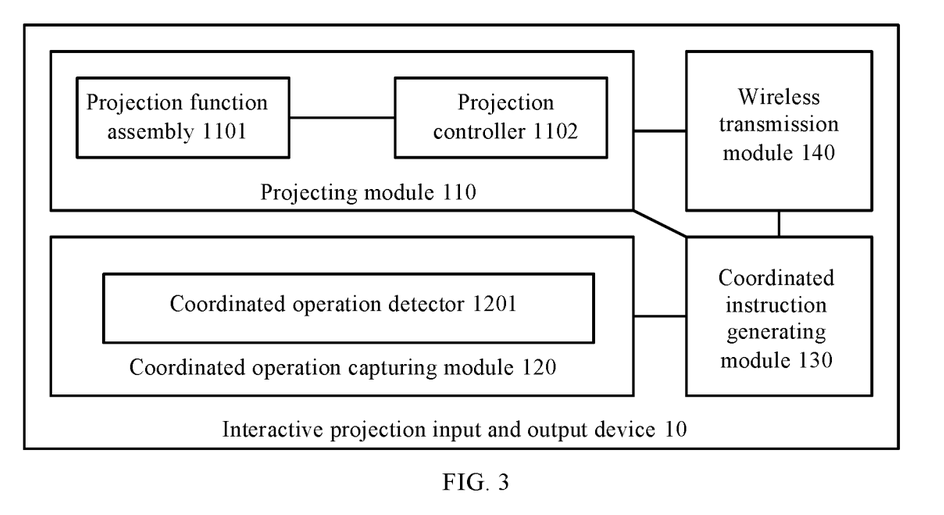
FIG. 3 is a block diagram illustrating another interactive projection input and output device according to an embodiment of the present disclosure.

FIG. 3 is a block diagram illustrating another interactive projection input and output device 10 according to an embodiment of the present disclosure. As shown in FIG. 3, the coordinated operation capturing module 120 involved in the embodiment of the present disclosure may only include a coordinated operation detector 1201 which is disposed to form the coordinated operation capture scope corresponding to the projection region. The coordinated operation detector 1201 is configured to: capture a user coordinated operation behavior occurring within the coordinated operation capture scope according to detected environmental physical signals; and determine the first coordinate of the user coordinated operation point within the coordinated operation capture scope and corresponding to the user coordinated operation behavior in the first coordinate system. For example, when the coordinated operation detector 1201 is a thermal signal detector, a temperature detection range may be formed on the projection picture by use of the thermal signal detector where the temperature detection range corresponds to the projection region. Under the first coordinate system of the temperature detection range, according to a temperature difference change within the temperature detection range, the first coordinate of the user coordinated operation point corresponding to the user coordinated operation behavior is identified and determined. When the coordinated operation detector 1201 is an audio signal detector, an ultrasonic detection range may be formed on the projection picture by use of the audio signal detector, where the ultrasonic detection range corresponds to the projection region. Under the first coordinate system of the ultrasonic detection range, according to an ultrasonic disturbance within the ultrasonic detection range, the first coordinate of the user coordinated operation point corresponding to the user coordinated operation behavior is identified and determined.

Alternatively, the coordinated operation capturing module involved in embodiments of the present disclosure may include a detection signal generator 1202 and the coordinated operation detector 1201. The detection signal generator 1202 is configured to form the coordinated operation capture scope corresponding to the projection region by sending detection signals; the coordinated operation detector 1201 is configured to: capture the user coordinated operation behavior occurring within the coordinated operation capture scope by detecting the detection signals; and determine the first coordinate of the user coordinated operation point corresponding to the user coordinated operation behavior within the coordinated operation capture scope in the first coordinate system. For example, when the detection signal generator 1202 is an optical signal generator and the coordinated operation detector 1201 is an optical signal detector, a light film corresponding to the projection region may be formed on the projection picture by use of the optical signal generator, a light spot position formed by the user coordinated operation behavior on the light film is captured by use of the optical signal detector, and then according to the light spot position under the first coordinate system of the light film, the first coordinate of the user coordinated operation point corresponding to the user coordinated operation behavior is determined. Alternatively, a laser dot matrix corresponding to the projection region is formed on the projection picture by use of the optical signal generator, a spatial position of an operated object formed by the user coordinated operation behavior in the laser dot matrix is captured by use of a TOF sensor or structured light detector, and then according to the spatial position under the first coordinate system of the laser dot matrix, the first coordinate of the user coordinated operation point corresponding to the user coordinated operation behavior is determined.

There is a correspondence present between the coordinated operation capture scope and the projection region corresponding to the external device 20 in the embodiments of the present disclosure. The correspondence may include that the coordinated operation capture scope at least covers the projection region. In this scenario, a user may directly perform control operation on the projection region. Therefore, the user may obtain a coordinated operation interaction experience similar to that on a traditional touch screen by using a coordinated operation habit of the traditional touch screen on a virtual touch screen formed by the coordinated operation capture scope and the projection region. The above correspondence may further include that the coordinated operation capture scope is separate from the projection region. For example, in a stereoscopic projection coordinated operation scenario, the projection region is located inside a three-dimensional space whereas the projection coordinated operation capture scope may be irrelevant to the three-dimensional space and independently located in another three-dimensional space or a two-dimensional plane. In this scenario, the user does not need to directly touch elements in the projection region but perform control operation on another space or plane corresponding to the projection coordinated operation capture scope. In this way, the user can obtain a coordinated operation interaction experience adapted to the stereoscopic projection coordinated operation scenario.

The first coordinate system involved in the embodiments of the present disclosure refers to a coordinate system of the coordinated operation capturing module, and specifically refers to a coordinate system defined when the coordinated operation detector 1201 performs spatial representation for an obtained detection result. Under the first coordinate system, the first coordinate of the user coordinated operation point can be obtained by obtaining an occurrence position for representing the user coordinated operation behavior. In an embodiment, the first coordinate system involved in the present disclosure is an absolute coordinate system and the first coordinate is an absolute coordinate under the absolute coordinate system. In an embodiment of the present disclosure, after a series of physical signals generated by the user coordinated operation behavior are captured, the coordinate information of the user coordinated operation point may be obtained by positioning based on image recognition technology. Detailed descriptions are made thereto in the related art, and thus no redundant descriptions are repeated herein.

A coordinated instruction generating module 130 is configured to: obtain a relative position relationship between the user coordinated operation point and the projection region according to the first coordinate of the user coordinated operation point and regional position information of the projection region in the first coordinate system, generate a position information instruction identifiable by an operating system of the external device 20 according to the relative position relationship and send the position information instruction to a wireless transmission module 140.

Optionally, the coordinated instruction generating module 130 involved in the embodiments of the present disclosure refers to an input and output hardware device module other than a main board installed with an operating system and CPU, which includes an application specific integrated circuit chip such as Application Specific Integrated Circuit (ASIC), DSP chip, and Field Programmable Gate Array (FPGA) and the like. The application specific integrated circuit chip includes a hardware computing circuit formed by burning. The hardware computing circuit is used to obtain the relative position relationship between the user coordinated operation point and the projection region according to the first coordinate of the user coordinated operation point and the regional position information of the projection region under the first coordinate system, and generate the position information instruction identifiable by the operating system of the external device 20 according to the relative position relationship. In an embodiment of the present disclosure, since the function of the coordinated instruction generating module 130 is implemented by the hardware computing circuit formed on the application specific integrated circuit chip by burning, the adaptability for repetitive tasks is high. Therefore, a higher execution efficiency than a traditional general computer system installed with CPU and operating system having approximate costs is brought, and a lower energy consumption than the general computer system is produced in a case of reaching the same computing efficiency. Due to less heat dissipation, fan-free designing can be adopted, saving additional costs for solving the heat dissipation problem.

In one or more embodiments of the present disclosure, the regional position information of the projection region in the first coordinate system may be obtained in the following two manners. In a first manner, after allocating the corresponding projection region, the projection controller 1102 determines initial regional position information of the projection region under its own coordinate system, and then unifies coordinate system with the coordinated operation capturing module. For example, the device structure of the interactive projection input and output device 10 is designed into a structure type which can maintain a spatial relative relationship of the projecting module coordinate system and the coordinated operation capturing module unchanged or a structure type that does not affect the coordinate system unification, so as to unify the coordinate system. Optionally, one or more additional check points are provided for the projecting module and the coordinated operation capturing module to unify their respective coordinate systems. Optionally, their respective coordinate systems are unified to a coordinate system of actual size based on a principle that respective detector performs ranging while a common reference origin is specified in advance. By the above methods, the respective coordinate systems of the projecting module and the coordinated operation capturing module are unified. At this time, the position information obtained in the two modules may be mutually applicable and interchangeable and may indicate a correct position relationship. The projection controller 1102 transmits the initial regional position information of the projection region under its own coordinate system to the coordinated instruction generating module 130, so as to form a correct relative position relationship with the first coordinate of the user coordinated operation point obtained by the coordinated instruction generating module 130 from the coordinated operation capturing module.

In a second manner, there is no need to unify the coordinate system. After capturing the first coordinate of the user coordinated operation point corresponding to the user coordinated operation behavior within the coordinated operation capture scope, the coordinated operation detector 1201 in the coordinated operation capturing module further identifies and captures the regional position information of the projection region in the first coordinate system and sends the first coordinate of the user coordinated operation point and the regional position information to the coordinated instruction generating module 130. Because the detected results are all obtained in the coordinated operation capturing module, naturally, a correct relative position relationship can be obtained.

In one or more embodiments of the present disclosure, the relative position relationship between the user coordinated operation point and the projection region refers to a relative position of the user coordinated operation point with respect to the interior of the projection region. For example, the projection region is a rectangle, the relative position may be marked in the form of "lower left vertex: (a,b)", where a and b are real numbers within an interval of 0 and 1 to represent that the lower left vertex of the projection region is a reference origin, a direction from the lower left vertex to the lower right vertex is x axis direction and a direction from the lower left vertex to the upper left vertex is y axis direction. A distance of the user coordinated operation point from the lower left vertex along the x axis direction is a times a total length of the projection region along the x axis direction and a distance from the lower left vertex along the y axis direction is b times a total length of the projection region along the y axis direction, namely, the (a,b) may be taken as a normalized coordinate of the first coordinate of the user coordinated operation point in the projection region. Based on the relative position relationship, a second coordinate of a point having the same position relationship may be generated in any other region of the same type, where the second coordinate is determined based on a second coordinate system of the other region of the same type. For example, by only determining information of a screen coordinate system of the external device 20 serving as the second coordinate system, the second coordinate of the virtual coordinated operation point to be displayed by the external device 20 may be generated based on the relative position relationship, such that the virtual coordinated operation point and a screen of the external device 20 satisfy the relative position relationship. It is noted that the external device 20 may not have a screen. However, it does not affect the determination of the virtual coordinated operation point. It is equivalent to that the external device 20 determines the screen coordinate system using a virtual screen formed by information to be displayed, so as to further determine the second coordinate of the virtual coordinated operation point. In this embodiment, the second coordinate system specifically is a screen coordinate system of the external device 20 and the second coordinate specifically is an absolute coordinate under the screen coordinate system.

In one or more embodiments of the present disclosure, the coordinated instruction generating module 130 may determine coordinate system information of the external device 20 based on any one of picture vertex coordinates and a screen resolution obtained from the wireless transmission module 140. For example, when determination is performed based on the picture vertex coordinates, a picture vertex with the coordinate (0,0) may be determined as a coordinate origin, a direction toward a picture vertex with the coordinate (m,0) from the coordinate origin is determined as x axis, and a direction toward a picture vertex with the coordinate (0,n) from the coordinate origin is determined as y axis, wherein m and n are positive integers. Thus, the screen coordinate system of the external device 20 is determined. Alternatively, when determination is performed based on the screen resolution, a regional attribute of the screen of the external device 20 is directly obtained based on the screen resolution m×n to generate the corresponding picture vertices (0,0), (m,0), (0,n) and (m,n), and establish the screen coordinate system of the external device 20. According to the determined screen coordinate system, an abscissa of the second coordinate of the virtual coordinated operation point to be displayed by the external device 20 is obtained by multiplying a total length of the screen of the external device 20 along the x axis direction by a in the relative position relationship (a,b), and an ordinate of the second coordinate of the virtual coordinated operation point to be displayed by the external device 20 is obtained by multiplying a total length of the screen of the external device 20 along the y axis direction by b in the relative position relationship (a,b), and thus the second coordinate of the virtual coordinated operation point is (m×a, n×b). Then a position information instruction for performing corresponding control operation at the virtual coordinated operation point is generated based on the second coordinate. Further, the eccentric distance is used to correct the second coordinate of the virtual coordinated operation point.

In one or more embodiments of the present disclosure, according to the operating system type obtained from the wireless transmission module 140, the coordinated instruction generating module 130 may generate the position information instruction adapted to the operating system type, so as to ensure the position information instruction generated based on the relative position relationship can be adapted to the operating system type of the external device 20 to cause the operating system of the external device 20 to call the underlying drive program to execute the position information instruction, thereby achieving the control operation in response to the user coordinated operation behavior. The position information instruction involved in the embodiments of the present disclosure includes a drive instruction of mouse, keyboard, touch pad and touch screen, or coordinate information for triggering the corresponding drive instruction. It is noted that the coordinate information involved in the present disclosure does not necessarily refer to coordinate information under a traditional coordinate system, and any information containing an absolute position or relative position of a target object may be regarded as the coordinate information involved in the present disclosure. In the present disclosure, the form of the coordinate information contained in the position information instruction is not limited. The underlying drive program involved in the embodiments of the present disclosure refers to a drive program of mouse, keyboard, touch pad and touch screen. Different from an application program, the underlying drive program is a special program enabling communication between a computer and a device, which is equivalent to a hardware interface. The operating system can control the work of the hardware devices only through the interface. If a drive program of a particular device is not correctly installed, it cannot work normally. In one or more embodiments of the present disclosure, the position information instruction is directly sent through a wireless connection to the operating system of the external device 20 such that the external device 20 directly calls the underlying drive program through the operating system to respond to the position information instruction rather than through a wireless connection of an application layer. The interactive projection input and output device 10 has no application program due to no operating system, and the external device 20 does not need to be installed with any APP or software. Coordinated operation for the external device 20 can be directly implemented through the underlying wireless connection. The control operation involved in the embodiments of the present disclosure refers to a coordinated operation such as pressing, cursor moving, panning, swiping and the like which can be performed by mouse, keyboard, touch pad and touch screen. Because the interactive projection input and output device 10 involved in the present disclosure only sends the position information instruction to the external device 20 and a response to the position information instruction and a further coordinated operation effect are both completed at the external device 20, it is equivalent to that the interactive projection input and output device 10 only sends the second coordinate information of the virtual coordinated operation point carried in the generated position information instruction to the external device 20 and then the operating system of the external device 20 converts it into a specific touch drive instruction. Therefore, the interactive projection input and output device 10 involved in the present disclosure can be regarded as a peripheral device capable of replacing mouse, keyboard, touch pad and touch screen.

Figure 4:
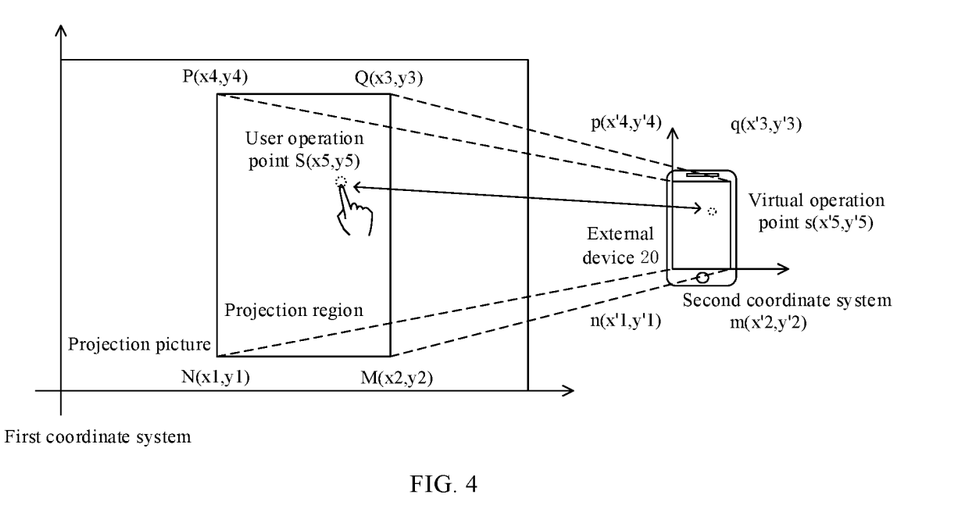
FIG. 4 is an application scenario diagram according to an embodiment of the present disclosure.

FIG. 4 is an application scenario diagram according to an embodiment of the present disclosure. As shown in FIG. 4, by taking coordinated control for the external device as an example, a process that the coordinated instruction generating module 130 converts the first coordinate into the second coordinate in the embodiments of the present disclosure will be described in detail. The coordinated instruction generating module 130 obtains a first coordinate (x5, x6) of a user coordinated operation point S and coordinate information of four vertices of a projection region contained in regional position information, namely, N(x1, y1), M(x2, y2), Q (x3,y3) and P(x4,y4), and a relative position relationship between the user coordinated operation point and the projection region is calculated based on the above principle. Taking the point N as a reference origin, the relative position relationship may be expressed as "N(x1, y1): ((x5−x1)/(x2−x1),(y5−y1)/(y4−y1))". Coordinate system information of the external device 20 may be determined based on the relative position relationship in combination with any one of the obtained picture vertex coordinates and screen resolution. For example, the picture vertex coordinates are n(x'1, y'1), m(x'2, y'2), q(x'3, y'3) and p(x'4, y'4) respectively and the value of y'1, y'2 and x'4 is generally 0. Therefore, a second coordinate system of the screen of the external device 20 may be determined, namely, the point n is a reference origin, a direction from the point n to the point m is x axis, and a direction from the point n to the point p is y axis. In this case, the second coordinate (x'5, y'5) of the virtual coordinated operation point S specifically is ((x5−x1)×(x'2−x'1)/(x2−x1), (y5−y1)×(y'4−y1)/(y4−y1)). Finally, the coordinated instruction generating module 130 determines a control logic for the second coordinate to adapt to the operating system of the external device 20 according to the second coordinate and the historical second coordinate in real time, and generates a position information instruction under the operating system of the external device 20 according to the control logic and a corresponding instruction format. The position information instruction directly includes a touch drive instruction executable by the operating system of the external device 20 by calling the corresponding touch underlying drive program. In another embodiment, the coordinated instruction generating module 130 may, after determining the second coordinate (x'5,y'5) of the virtual coordinated operation point S, directly send the second coordinate information as the position information instruction to the external device 20, such that the operating system of the external device 20 automatically converts the second coordinate information contained in the received position information instruction into a specific touch drive instruction under its own operating system based on a corresponding Bluetooth protocol. As a result, in this embodiment, the coordinated instruction generating module 130 will no longer need to complete the coordinated operation of converting the second coordinate into the touch drive instruction under the operating system of the external device 20.

The wireless transmission module 140 is configured to establish an uplink wireless connection and a downlink wireless connection with the external device 20. The wireless transmission module 140 receives screen mirroring information from the external device 20 through the downlink wireless connection where the screen mirroring information includes the screen mirroring content, and sends the position information instruction to the external device 20 through the uplink wireless connection such that the operating system of the external device 20 calls the underlying drive program to execute the position information instruction, so as to achieve a control operation in response to the user coordinated operation behavior and thus control the external device 20.

The wireless connection involved in the embodiments of the present disclosure includes but is not limited to: router, Bluetooth, Near Field Communication (NFC), Ultra Wide Band (UWB), ZigBee, Light Fidelity (LiFi), Narrow Band Internet of Things (NB-IOT), enhanced Machine-Type Communication (eMTC), Long Range Radio (LoRa), tuner, Global Navigation Satellite System (GNSS), Low Noise Block (LNB), cellular 3G, cellular 4G, cellular 5G, cellular 6G, Wireless Fidelity (WiFi), 5G, 6G, wireless USB, or its own wireless hotspot. For example, the type of the communication protocol adopted for the downlink wireless connection established between the wireless transmission module and the external device includes: router, Bluetooth, NFC, UWB, ZigBee, LiFi, NB-IOT, eMTC, LoRa, tuner, GNSS, LNB, cellular 3G, cellular 4G, cellular 5G, cellular 6G, WiFi, 5G, 6G or its own wireless hotspot; the type of the communication protocol adopted for the uplink wireless connection established between the wireless transmission module and the external device includes: Bluetooth, Bluetooth Low Energy (BLE), NFC, router, WiFi, NB-IOT, eMTC, LoRa, tuner, GNSS, LNB, Z-Wave, cellular 3G, cellular 4G, cellular 5G, cellular 6G, NFC, router, WiFi, 5G, 6G or wireless USB. Further, in the embodiments of the present disclosure, one or more wireless connections may be established between the wireless transmission module 130 and one external device 20. When a plurality of wireless connections are established, the types of the plurality of wireless connections may be same or different. For example, the wireless transmission module 140 receives the screen mirroring information from the external device 20 through an uplink WiFi connection and at the same time, sends the position information instruction to the external device 20 through the same WiFi connection or another WiFi connection. At this time, the uplink wireless connection and the downlink wireless connection are a same connection or a connection of the same type. Alternatively, the wireless transmission module 140 receives the screen mirroring information from the external device 20 through an uplink WiFi connection and sends the position information instruction to the external device 20 through a Bluetooth connection. At this time, the uplink wireless connection and the downlink wireless connection are different connections of different types. In this way, the external device 20 is controlled by transmitting the absolute coordinate through the Bluetooth connection. Since the first coordinate transmitted is an absolute coordinate rather than a relative coordinate, a reverse control for an external touch screen may be achieved.

In addition to the above screen mirroring content, the screen mirroring information involved in the embodiments of the present disclosure may further include one or more of picture vertex coordinates, a screen resolution, a horizontal and vertical screen orientation, a data rate, a frame rate, an operating system type, a video size and the like, which is not limited herein. The data rate and the frame rate are used jointly to calculate the screen resolution and the horizontal and vertical screen orientation. For example, when transmitting the screen resolution and the horizontal and vertical screen orientation to the coordinated instruction generating module 130, the wireless transmission module 140 may obtain the corresponding information of the screen resolution and the horizontal and vertical screen orientation by calculating using the data rate and the frame rate and then transmit the information to the coordinated instruction generating module 130, or directly transmit the data rate and the frame rate to the coordinated instruction generating module 130, such that the coordinated instruction generating module 130 obtains the information of the screen resolution and the horizontal and vertical screen orientation by calculating by itself based on the received data rate and frame rate.

In the embodiments of the present disclosure, the screen picture of the external device 20, the projection region formed by the projecting module and the coordinated operation scope formed by the coordinated operation capturing module are correlated and a position information instruction identifiable by the operating system of the external device 20 is generated using the captured first coordinate of the user coordinated operation point through the coordinated instruction generating module 130 and then sent to the external device 20 through the wireless transmission module 140, thereby achieving remote control over the external device 20 by a virtual wireless touch screen. Since the coordinated instruction generating module 130 generates the position information instruction based on the relative position relationship between the user coordinated operation point and the projection region and the external device 20 may respond to affect the control operation corresponding to the position information instruction with the help of the underlying drive program, coordinated control can be performed on the external device 20 without installing APP or software in the external device 20.

Furthermore, the coordinated instruction generating module 130 may also generate the position information instruction based on the relative position relationship between the user coordinated operation point and the projection region and the screen resolution of the external device 20, so as to achieve coordinated control on the external device 20 of any screen resolution or any screen size.

Furthermore, the coordinated instruction generating module 130 may also generate the position information instruction based on the relative position relationship between the user coordinated operation point and the projection region and the screen resolution and the operating system type of the external device 20, so as to achieve coordinated control on the external device 20 of any operating system, any screen resolution or any screen size.

Optionally, the projecting module 110 includes an eye sight protection filter. The eye sight protection filter includes an eye sight protection filter lens or an eye sight protection filter film. For example, in a light path formed by the projection lenses of the projecting module 110, a nano-blue light filter is added to reduce a density of high energy blue light with a wavelength of 410-460 nanometers without affecting a proportional relationship of the blue light in various groups of RGB colors, thereby avoiding color distortion of the projection picture. As a result, on the basis of ensuring the picture is clear and real, the harm of the high energy blue light to human body can be reduced. Further, in the light path formed by the projection lenses, a low-pass light filter of quartz or synthetic material may also be added to further reduce the influence of the stroboscopic effect in human eyes, thereby improving the watching experiences of users. Because the blue light radiation received by children is double that of adults, by adding the eye sight protection filter lens or the eye sight protection filter lens film, the interactive projection input and output device 10 will be better adapted to a scenario of children education, thus minimizing the unfavorable effect on their eye sight health when the children are watching the projection picture.

Optionally, the projection controller 1102 may be further configured to, in response to a received projection adjustment instruction sent when the coordinated instruction generating module 130 identifies a gesture operation corresponding to the projection adjustment function, adjust a position, an angle and/or a size of the projection region. In an embodiment of the present disclosure, the coordinated instruction generating module 130 is further configured to identify a gesture operation of a user based on the first coordinates of a plurality of groups of user coordinated operation points, and when identifying a gesture operation corresponding to the projection adjustment function, send the projection adjustment instruction to the projecting module, such that the projection controller 1102 in the projecting module re-allocates the corresponding projection region based on the projection adjustment instruction, so as to adjust the position, the angle and/or the size of the projection region.

In the embodiments of the present disclosure, the user may adjust the position, the angle and/or the size of the projection region based on the gesture operation corresponding to the projection adjustment function, thus optimizing the operation experiences of the user.

Optionally, the projection controller 1102 may be further configured to perform spectral correction favorable for protection of the eye sight according to optical electronic information contained in the screen mirroring content, for example, reduce a proportion of blue light in the spectra. Thus, without affecting the picture sharpness, the unfavorable effect on the eye sight health can be minimized.

Optionally, the coordinated instruction generating module 130 may adjust the relative position relationship according to the horizontal and vertical screen orientation. The horizontal and vertical screen orientation may change the shape of the projection region, generating the effect of inverting the screen resolution of the external device 20, for example, inverting the screen resolution m×n into n×m, whereas the external screen coordinate system does not change along with change in the horizontal and vertical orientation. At this time, according to the relative position relationship obtained by calculating based on the regional position information of the projection region and the first coordinate of the user coordinated operation point, it is impossible to generate a correct second coordinate of the virtual coordinated operation point under the screen coordinate system. As a result, it is required to adjust the original relative position relationship based on the horizontal and vertical screen orientation such that the correct second coordinate of the virtual coordinated operation point can be generated based on the adjusted relative position relationship under the screen coordinate system.

In the embodiments of the present disclosure, because the coordinated instruction generating module 130 considers the influence of the horizontal and vertical screen orientation on the calculation of the second coordinate of the virtual coordinated operation point, in a case that the external device 20 changes the horizontal and vertical screen orientation, correct coordinated control can be still performed on the external device 20 through a virtual wireless touch screen formed by the interactive projection input and output device 10.

Optionally, the wireless transmission module 140 is further configured to:
  send its own product identification information to the external device 20 such that the external device 20 searches for a corresponding underlying drive program; and
  receive a driver download request returned by the external device in a case of failing to find the underlying drive program, and send an underlying drive program corresponding to the driver download request to the external device 20, such that the external device 20 installs the underlying drive program and executes the position information instruction based on the underlying drive program.

In the embodiments of the present disclosure, when the external device 20 does not install the underlying drive program for executing the position information instruction, an underlying drive program that corresponds to the driver download request and is pre-stored in the interactive projection input and output device 10 may be sent to the external device 20, such that the external device 20 installs the underlying drive program. Thus, in a case of initially unable to identify the position information instruction, the external device 20 can still respond to the coordinated control of the interactive projection input and output device 10 by downloading and installing the corresponding underlying drive program.

Figure 5:
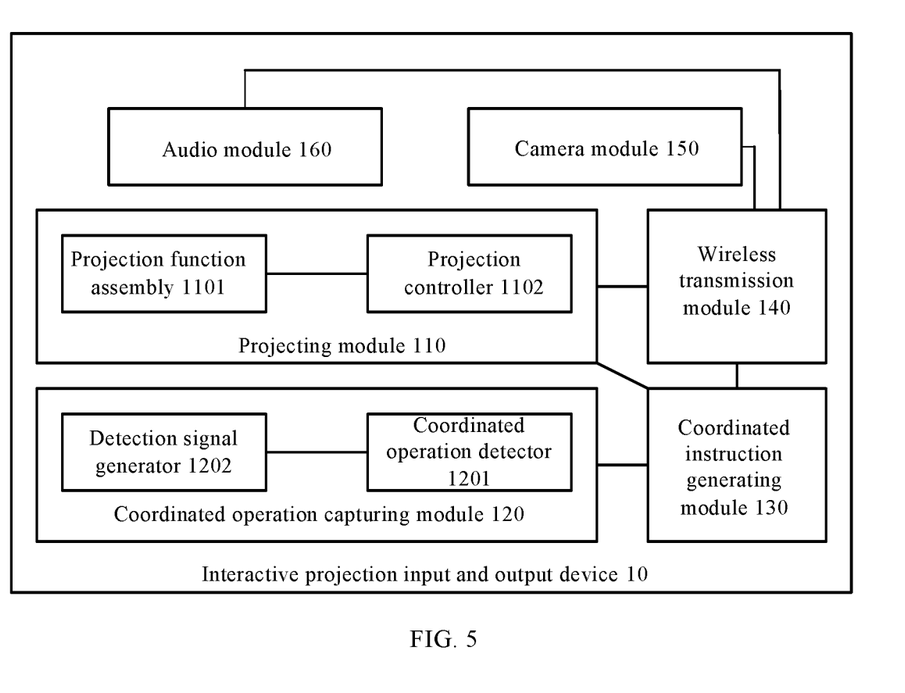
FIG. 5 is a block diagram illustrating yet another interactive projection input and output device according to an embodiment of the present disclosure.

FIG. 5 is a block diagram illustrating yet another interactive projection input and output device 10 according to an embodiment of the present disclosure. As shown in FIG. 5, on the basis of the embodiment shown in FIG. 2, the interactive projection input and output device 10 may further include:
  a camera module 150, configured to acquire image information, for example, image information obtained from environment by a camera; and
  an audio module 160, configured to acquire audio information and play audio information received by the wireless transmission module 140 from the external device 20, for example, acquire audio information from environment by a microphone and play, through a loudspeaker, the audio information received by the wireless transmission module 140 from the external device 20.

In the embodiments of the present disclosure, in addition to the camera module 150 and the audio module 160, more peripheral devices such as gravity sensor and GPS positioning chip may be added to the interactive projection input and output device 10. In this case, the interactive projection input and output device 10 involved in the present disclosure has stronger functionality. For example, when the external device 20 is a cloud device, the to-be-displayed screen mirroring content output by the cloud device may be displayed by screen mirroring and more information interactions with the cloud device can also be performed through the camera module 150 and the audio module 160 to implement richer scenario functions such as photographing and sound recording.

Optionally, the interactive projection input and output device 10 provided by the present disclosure may also be integrated in any other hardware device or product, for example, in a pair of glasses. At this time, the projecting module 110 may project the projection picture directly to the retinas of the human eyes, or to the lenses of a pair of glasses, or to air. At the same time, the coordinated operation capturing module 120 can capture a gesture of a user within a coordinated operation capture scope or track a "touch" operation behavior of the eye balls in the air. Thus, the coordinated instruction generating module 130 generates a corresponding position information instruction and transmits the position information instruction to the external device 20 through the wireless transmission module 140, so as to achieve coordinated operation for the external device 20 such as smart phone or a cloud host.

Optionally, when a plurality of external devices 20 are present, the projecting module is specifically configured to: project the screen mirroring contents from the plurality of external devices 20 to the projection regions of the projection picture corresponding to the plurality of external devices 20 respectively. In the embodiments of the present disclosure, the projection controller 1102 can perform adaptive adjustment to each projection region according to video size information of a plurality of pieces of screen mirroring information, thereby achieving an optimal layout.

The coordinated instruction generating module 130 is specifically configured to: according to the first coordinate of the user coordinated operation point and the regional position information of each projection region in the first coordinate system, determine a specific projection region where the user coordinated operation point is located and obtain a relative position relationship between the user coordinated operation point and the specific projection region, and according to the relative position relationship, generate the position information instruction identifiable by the operating system of the specific external device 20 corresponding to the specific projection region. In the embodiments of the present disclosure, the specific projection region where the user coordinated operation point is located may be specifically determined in the following manner: according to the regional position information of each projection region, obtaining four vertex coordinates of the corresponding projection region, and when the first coordinate of the user coordinated operation point falls inside four vertex coordinates of a particular projection region, determining the particular projection region as the specific projection region.

The wireless transmission module 140 is specifically configured to: establish respective wireless connections with the plurality of external devices 20 and receive screen mirroring information from the plurality of external devices 20 through respective wireless connections, where the screen mirroring information includes the screen mirroring content; and, receive a position information instruction for the specific external device 20 from the coordinated instruction generating module 130 and send the position information instruction to the specific external device 20 through the wireless connection corresponding to the specific external device 20. In this case, the operating system of the specific external device 20 calls the underlying drive program to execute the position information instruction so as to achieve a control operation in response to the user coordinated operation behavior, thereby controlling the external device 20.

In the embodiments of the present disclosure, the wireless transmission module 140 may allocate one mark to the external device 20 successfully establishing a wireless connection to a correspondence of the external device 20, the wireless connection and the mark, and then send the correspondence to the coordinated instruction generating module 130. Thus, after determining the specific projection region and further determining the specific external device 20 corresponding to the specific projection region, the coordinated instruction generating module 130 may make a mark corresponding to the specific external device 20 based on the correspondence at the time of generating the position information instruction, and send the marked position information instruction to the wireless transmission module 140. The wireless transmission module 140 removes the mark of the marked position information instruction according to the correspondence, and sends the position information instruction to the corresponding specific external device 20 through the wireless connection corresponding to the mark.

Figure 6:
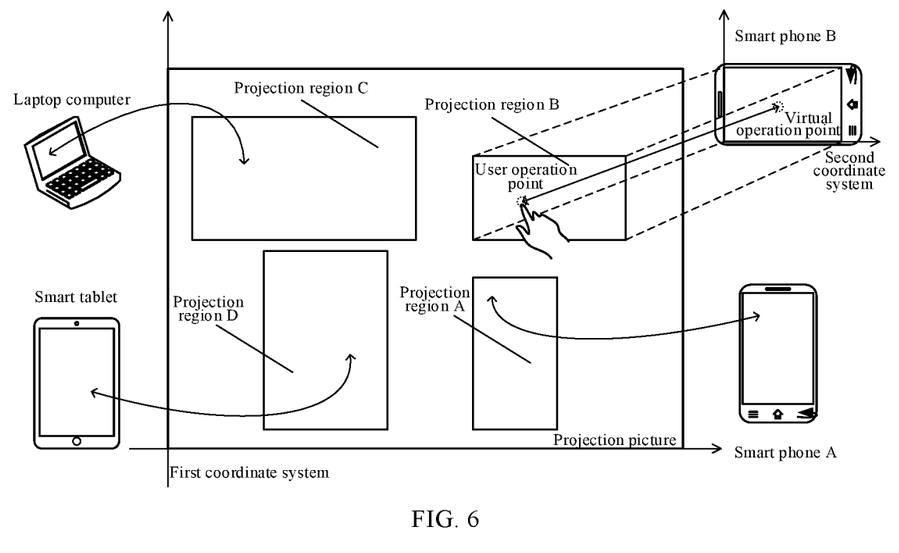
FIG. 6 is another application scenario diagram according to an embodiment of the present disclosure.

As shown in FIG. 6, by taking coordinated control on a smart phone A, a smart phone B, a smart tablet and a laptop computer in the application scenario as an example, detailed descriptions are made to an embodiment of the present disclosure.

The wireless transmission module 140 firstly establishes corresponding wireless connections with the above plurality of external devices 20 respectively, receives screen mirroring information from the plurality of external devices 20 through respective wireless connections, and sends a screen mirroring content and a video size analyzed out to the projecting module and establishes a correspondence of the external device 20, the wireless connection and the mark at the same time. For example, the correspondence of the smart phone A is "0x0001-192.168.1.2-23", where "0x0001" is an internal device code of the smart phone A, "192.168.1.2" is a network address of the smart phone A used to obtain a network connection established with the smart phone A, and "23" is a mark of the smart phone A. Similarly, the correspondences of the smart phone B, the laptop computer and the smart tablet may also be established, and then sent to the coordinated instruction generating module 130.

The projection controller 1102 can perform adaptive adjustment to each projection region according to the video size information of a plurality of pieces of screen mirroring information obtained from the wireless transmission module 140, so as to achieve an optimal layout of various projection regions shown in the projection picture of the FIG. 6. The projecting module projects the screen mirroring contents of the above plurality of external devices 20 to the projection regions of the projection picture corresponding to various external devices 20 respectively, where the smart phone A corresponds to the projection region A, the smart phone B corresponds to the projection region B, the laptop computer corresponds to the projection region C, and the smart tablet corresponds to the projection region D.

The coordinated instruction generating module 130 obtains region vertex coordinates of each projection region according to regional position information of each projection region. If the first coordinate of the user coordinated operation point falls inside the vertex coordinates of the projection region A, it is determined that the user is attempting to coordinated control the smart phone A corresponding to the projection region A. In this case, the coordinated instruction generating module 130 may obtain a relative position relationship of the user coordinated operation point and the projection region A according to the first coordinate of the user coordinated operation point and the vertex coordinates of the projection region A. If the relative relationship is calculated as "(lower left vertex): (0.25,0.8)", it means that, with the lower left vertex as a reference origin, a length-width ratio of the user coordinated operation point with respect to the projection region along the x axis direction is 0.25, and a length-width ratio along the y axis direction is 0.8. In this case, according to the relative position relationship, a second coordinate of a virtual coordinated operation point of the smart phone A under its screen coordinate system may be generated. If a screen resolution of the smart phone A is 450×800, the second coordinate of the virtual coordinated operation point can be calculated as (112.5,640). A position information instruction identifiable by an Android operating system of the smart phone A is generated according to the second coordinate, and then the position information instruction is given a mark "23" corresponding to the smart phone A according to the correspondence sent by the wireless transmission module 140 and then sent to the wireless transmission module 140.

Finally, the wireless transmission module 140 receives the position information instruction with the mark "23" from the coordinated instruction generating module 130, obtains the external device 20 corresponding to the mark as the smart phone A by searching for a correspondence, removes the mark of the position information instruction and then sends the position information instruction to the smart phone A through a wireless connection established with the smart phone A. In this case, the operating system of the smart phone A calls the underlying drive program to execute the position information instruction, so as to achieve a control operation in response to the user coordinated operation behavior, thereby controlling the external device 20.

In the embodiments of the present disclosure, when a plurality of external devices 20 are in wireless connection with the interactive projection input and output device 10 at the same time, the plurality of external devices 20 can be controlled simultaneously by use of a plurality of virtual wireless touch screens formed by a plurality of projection regions in the projection picture.

Optionally, on the basis of the above embodiments of the present disclosure, the coordinated instruction generating module 130 is further configured to: when identifying a gesture operation corresponding to a file sharing function, determine an external device as a sharing end and position information of a shared file to be displayed in the external device as the sharing end, based on a start point of the gesture operation, determine an external device as a receiving end based on a swipe direction or endpoint of the gesture operation, and generate a file sharing position information instruction, wherein the file sharing position information instruction is used to share the shared file from the external device as the sharing end to the external device as the receiving end.

The wireless transmission module 140 is further configured to send the file sharing position information instruction to the external device as the sharing end, and thus the external device as the sharing end: through a wireless connection established with the external device as the receiving end, sends the shared file to the external device as the receiving end; or, through a wireless connection established with the wireless transmission module 140, sends the shared file to the wireless transmission module 140 such that the wireless transmission module 140 sends the received shared file to the external device as the receiving end through a wireless connection established with the external device as the receiving end.

In the embodiments of the present disclosure, the above file sharing position information instruction is a pre-defined keyboard-mouse macro which may be custom-created by a user or pre-stored in system. The coordinated instruction generating module 130 may identify a gesture operation corresponding to the user coordinated operation behavior according to the first coordinates of a plurality of groups of user coordinated operation points. When a gesture operation corresponding to file share is identified, an external device as a sharing end and position information of a shared file to be displayed in the external device as the sharing end may be determined based on a start point of the gesture operation, and an external device as the receiving end is determined based on a swipe direction or endpoint of the gesture operation. Furthermore, a keyboard-mouse macro applicable to the current file share scenario is called and sent to the wireless transmission module 140, and the wireless transmission module 140 is instructed to send the keyboard-mouse macro to the external device as the sharing end. Since the keyboard-mouse macro is actually a string of position information instructions, the external device as the sharing end may, after receiving the keyboard-mouse macro, still call the underlying drive program through the operating system to execute the keyboard-mouse macro. In this way, the control operation by which the shared file is shared to the external device as the receiving end through an operation flow of the keyboard-mouse macro in the current scenario can be realized, thus controlling the external device 20.

For example, when the wireless connection is a Bluetooth connection, the operation flow corresponding to the keyboard-mouse macro is as follows: a position of the shared file in the screen of the external device as the sharing end is long-pressed and after a predetermined period of waiting time, sending through Bluetooth is selected from a pop-up selection bar and thus the shared file is sent to the wireless transmission module 140 of the interactive projection input and output device 10. Till now, the keyboard-mouse macro flow is ended. In addition, when the external device 20 executes the keyboard-mouse macro, the wireless transmission module 140 will shield the position information instruction sent to the external device 20. After receiving the shared file from the external device as the sharing end, the wireless transmission module 140 may continue sending the shared file to the external device as the receiving end determined based on the gesture operation. Thus, file share for the specified shared file is completed. In another embodiment, if the external device as the sharing end already establishes a wireless connection with the external device as the receiving end, a corresponding keyboard-mouse macro is called and sent to the external device as the sharing end, such that the external device as the sharing end executes a control operation by which the shared file is sent to the external device as the receiving end through the wireless connection established with the external device as the receiving end, thus completing file share for the specified shared file.

As shown in FIG. 6, with the example in which the smart tablet shares the shared file to the laptop computer in the application scenario diagram, detailed descriptions will be made to an embodiment of the present disclosure. In this application scenario, the screen mirroring content of the smart tablet is projected to the projection region D, and the screen mirroring content of the laptop computer is projected to the projection region C. When the coordinated instruction generating module 130 identifies a gesture operation corresponding to a file sharing function, because the coordinate of the start point of the gesture operation falls inside the projection region D, it is determined that the external party as the sharing end is the smart tablet corresponding to the projection region D. Based on the above mentioned method, according to the relative position relationship of the coordinate of the start point in the projection region D, a second coordinate of the smart tablet for file sharing under the screen coordinate system is obtained. Because the wipe direction of the gesture operation faces toward the projection region C, or the endpoint falls in the projection region C, it is determined that the external device as the receiving end is the laptop computer corresponding to the projection region C.

A keyboard-mouse macro pre-defined by user in the scenario is called, and the keyboard-mouse macro is formed of one group of position information instructions identifiable by the operating system of the smart tablet. The second coordinate for file share is taken as a variable to adjust the keyboard-mouse macro. As a result, the keyboard-mouse macro can select the shared file corresponding to the coordinate of the start point on the projection region D on the smart tablet and then the adjusted keyboard-mouse macro is given a mark corresponding to the smart tablet and then sent to the wireless transmission module 140.

The wireless transmission module 140 sends the keyboard-mouse macro to the smart tablet through a wireless connection established with the smart tablet according to the mark on the keyboard-mouse macro, and, before receiving the shared file from the smart tablet, shields the position information instruction sent to the smart tablet. After the smart tablet receives the keyboard-mouse macro, the operating system of the smart tablet calls the underlying drive program to execute the keyboard-mouse macro. For example, after the position of the second coordinate for file share is long-pressed for a predetermined period of time under its own screen coordinate system, transmitting through wireless connection established with the interactive projection input and output device 10 is selected from a pop-up selection bar such that the shared file is sent to the wireless transmission module 140 of the interact projection input and output device 10. After receiving the shared file from the smart tablet, the wireless transmission module 140 ends the shielding for the position information instruction, and continues executing subsequent steps of the file sharing function so as to send the shared file to the laptop computer through a wireless connection established with the laptop computer, thereby completing file share for the specified shared file.

In the embodiments of the present disclosure, in a scenario in which the interactive projection input and output device 10 establishes wireless connections with a plurality of external devices 20, quick share for a specified shared file may be completed. In this way, the efficiency that the user shares a file is improved, and the interaction of the user in the scenario of interactive control of a plurality of external devices 20 is increased.

Figure 7:
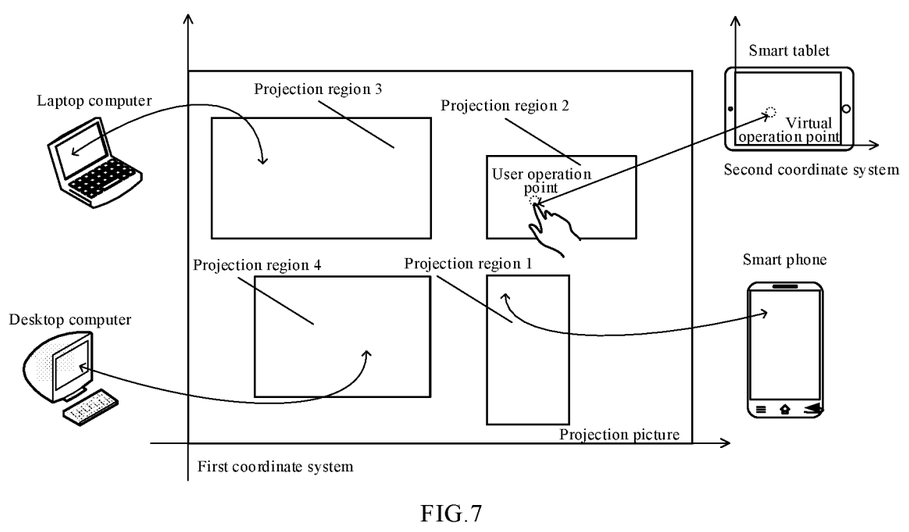
FIG. 7 is yet another application scenario diagram according to an embodiment of the present disclosure.

With a process in which the interactive projection input and output device 10 performs coordinated control over the smart phone A with iOS operating system, the smart table with Android operating system, the desktop computer with Windows operating system and the laptop computer with Mac operating system, detailed descriptions are made below to the function of the interactive projection input and output device 10 involved in the embodiments of the present disclosure. With reference to FIG. 7, the above coordinated control scenario may be implemented through mutual cooperation of the smart phone, the smart tablet, the desktop computer, the laptop computer and the interactive projection input and output device 10. The flow may include the following steps.

The wireless transmission module 140 establishes WiFi hotspot connections with the smart phone, the smart tablet, the desktop computer and the laptop computer at the same time, and receives screen mirroring information from corresponding external devices 20 through the established WiFi hotspot connections, and then transmits the screen mirroring information to a projection system. At the same time, the wireless transmission module 140 sends Bluetooth pairing requests to nearby external devices 20, and the above external devices 20, after receiving the Bluetooth pairing requests, establishes Bluetooth connections with the wireless transmission module 140 respectively. In this case, encrypted transmission of information between the wireless transmission module 140 and the external devices 20 can be implemented based on a predetermined encryption algorithm to mutually send encryption information, product identity information, version identity information, and identity address information and the like. Therefore, each of the smart phone, the smart tablet, the desktop computer and the laptop computer searches its own operating system based on the Product Identity Information provided by the wireless transmission module 140 to determine whether there is an adaptive underlying drive program. Finally, the smart phone, the smart tablet and the laptop computer all successfully obtain their adaptive underlying drive programs but the desktop computer fails to obtain an adaptive underlying drive program. As a result, the desktop computer will send a driver download request to the wireless transmission module 140. When receiving the driver download request, the wireless transmission module 140 may send a corresponding underlying drive program to the desktop computer. Thus, the desktop computer may install the underlying drive program so as to subsequently respond to the position information instruction.

The projection controller 1102 in the projecting module receives the screen mirroring information of the above four external devices 20 from the wireless transmission module 140, analyzes the screen mirroring information of each external device 20, obtains information corresponding to a plurality of external devices 20, such as picture vertex coordinate, picture video size, screen resolution, horizontal and vertical screen orientation, screen mirroring content, data rate, and frame rate, allocates a projection region to a corresponding external device 20 according to the video size and the screen mirroring content in the above information, and after unifying coordinate system with the coordinated operation capturing module, generates the vertex coordinates of the projection region. With the smart tablet as an example, firstly, a projection orientation of the projecting module and a capture orientation of the coordinated operation capturing module are relatively fixed, and thus it may be guaranteed that the projecting module and the coordinated operation capturing module are under the same coordinate system. Since the picture video size of the smart tablet is 16:9, the Digital Micromirror Device (DMD) may be controlled to allocate a projection region 2 of dimension 16:9 having a proper size and position to the smart tablet. In order to obtain the projection region 2, the projection controller 1102 needs to allocate a corresponding micro-lens group to the projection region in the DMD matrix, such that the number of the micro-lens groups controls the size of the projection region 2, and the morphology and position of the micro-lens group control the dimension and position of the projection region 2. Under the control of DMD, the screen mirroring content is projected by a projection lens to the projection picture, where the projection picture includes the projection region 2 allocated to the smart tablet. After forming the projection picture, the projection controller 1102 generates the vertex coordinates of the projection region 2 according to the current imaging focal length and the position and number of micro-lenses used to generate the projection region 2, and sends the vertex coordinates of the projection region 2 to the coordinated instruction generating module 130.

Similarly, projection regions may be allocated to other external devices, and corresponding screen mirroring contents are projected to respective projection regions and finally, a projection region 1, a projection region 2, a projection region 3 and a projection region 4 which are not overlapped with each other will be formed on the projection picture. Further, the vertex coordinates of the regional position information representing respective projection regions are sent to the coordinated instruction generating module 130, and the picture vertex coordinate, the screen resolution, and the horizontal and vertical screen orientation of a plurality of external devices 20 are also sent to the coordinated instruction generating module 130 at the same time. In another embodiment, because the projection module does not need to unify coordinate system with the coordinated operation capturing module, it is not required to calculate and send the vertex coordinates of the projection region.

The coordinated operation capturing module includes a detection signal generator 1202 and a coordinated operation detector 1201. In the embodiments of the present disclosure, the detection signal generator 1202 specifically is an infrared laser generator, and the coordinated operation detector 1201 specifically is an infrared camera. The infrared laser generator may generate a laser virtual coordinated operation film attached about 0.5 mm to 5 mm from a plane where the projection picture is located; and the infrared camera is placed above a coordinated operation plane (generally placed at the side of the projection lens) to take an infrared image. When the infrared image includes a light spot formed by the user through coordinated operation on the laser virtual coordinated operation film, a coordinate of the user coordinated operation point under an image coordinate system is determined according to position and shape of the light spot in the infrared image and image recognition-related technology, and further, the first coordinate of the user coordinated operation point under the same coordinate system as the projecting module is obtained according to the photographing focal length and then sent to the coordinated instruction generating module 130. In another embodiment of the present disclosure, the coordinated operation capturing module does not need to unify coordinate system with the projecting module but determines the image coordinate system as the first coordinate system and, after identifying the user coordinated operation point on the infrared image, further identifies the projection region where the user coordinated operation point is located, and at the same time, determines the coordinates of the user coordinated operation point and the four vertices of the projection region under the image coordinate system, and then sends all these coordinates to the coordinated instruction generating module 130, where the coordinates of the four vertices are used to represent the regional position information of the projection region.

The coordinated instruction generating module 130 obtains the relative position relationship between the user coordinated operation point and the projection region according to the first coordinate of the user coordinated operation point and the regional position information of the projection region under the first coordinate system. Specifically, the relative position relationship is a length-to-width ratio of the user coordinated operation point along the x axis direction and the y axis direction with respect to the projection region. For example, if the coordinates of the four vertices of the projection region 2 corresponding to the smart tablet are (1600,1100), (2400,1100), (1600,1550) and (2400,1550), whereas the first coordinate of the user coordinated operation point is (2000,1235). In this case, firstly, because the first coordinate falls inside the four vertices of the projection region 2, it is determined that coordinated control is currently performed for the smart phone 2 corresponding to the projection region 2. Then, it is required to calculate the relative position relationship of the user coordinated operation point with respect to the projection region 2: with the lower left vertex (1600,1100) as a reference origin, a ratio of the user coordinated operation point with respect to the projection region along the x axis direction is calculated as a quotient of a distance of the user coordinated operation point with respect to the reference origin along the x axis direction and a total length of the projection region along the x axis direction, that is, (2000−1600)/(2400−1600) =0.5, and a ratio of the user coordinated operation point with respect to the projection region along the y axis direction is calculated as a quotient of a distance of the user coordinated operation point with respect to the reference origin along the y axis direction and a total length of the projection region along the y axis direction, that is, (1235−1100)/(1550−1100)=0.3. As a result, the above relative position relationship may be expressed as "lower left vertex: (0.5,0.3)".

Furthermore, the horizontal and vertical screen orientation of the smart tablet is horizontal screen, it is required to make adjustment to the above relative position relationship. In a case of the lower left vertex being the reference origin, specifically, "lower left vertex: (a,b)" is adjusted to "lower left vertex: (b,1−a)". Therefore, "lower left vertex: (0.5,0.3)" is adjusted to "lower left vertex: (0.3,0.5)". Furthermore, according to the picture vertex coordinates or the screen resolution of the smart tablet, a second coordinate of a virtual coordinated operation point to be displayed by the smart tablet is generated. If the picture vertices of the smart tablet are (0,0), (1080,0), (0,1920) and (1080,1920) respectively with the vertex (0,0) being a lower left vertex, the second coordinate of the virtual coordinated operation point under the screen coordinate system of the smart tablet is calculated based on the adjusted relative position relationship, where the abscissa value is the total pixel of the x axis of the screen times the x value in the relative position relationship, namely, (1080−0)×0.3=324, and the ordinate value is the total pixel of the y axis of the screen times the y value in the relative position relationship, namely, (1920−0)×0.5=960. Finally, the second coordinate of the virtual coordinated operation point under the screen coordinate system of the smart tablet is calculated as (324,960).

Since the operating system of the smart tablet is Android, a control logic for the second coordinate to adapt to the Android operating system may be determined in real time according to the second coordinate and a historical second coordinate, and then a position information instruction under the Android operating system is generated according to the control logic and corresponding instruction format, and finally the position information instruction is given a mark corresponding to the smart tablet and then sent to the wireless transmission module 140. The mark is used to instruct the wireless transmission module 140 to send the position information instruction to the smart tablet.

The wireless transmission module 140 receives the position information instruction from the coordinated instruction generating module 130 and determines to send the position information instruction to the smart tablet according to the mark carried in the position information instruction. Therefore, after removing the mark of the position information instruction, the wireless transmission module 140 sends the position information instruction to the smart tablet through a Bluetooth connection pre-established with the smart tablet, such that the smart tablet, after receiving the position information instruction, calls a corresponding underlying drive program in its operating system to execute the position information instruction, so as to achieve a control operation in response to the virtual coordinated operation point, thereby controlling the external device 20.

The apparatus embodiments described above are merely illustrative, where the modules described as separate members may be or not be physically separated, and the members displayed as modules may be or not be physical units, i.e., may be located in one place, or may be distributed to a plurality of network modules. Part or all of the modules may be selected according to actual requirements to implement the objectives of the solutions in the embodiments. Those of ordinary skill in the art may understand and carry out them without creative work.

The specific embodiments are described as above. Other embodiments may also be obtained within the scope of the appended claims. In some cases, the actions or steps recorded in the claims may be performed in a sequence different from the embodiments to achieve the desired result. Further, the processes shown in drawings do not necessarily require a particular sequence or a continuous sequence to achieve the desired result. In some embodiments, a multi-task processing and parallel processing are possible and may also be advantageous.

Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the related art that are not disclosed in the present disclosure. The specification and embodiments are considered as exemplary only, with a true scope and spirit of the present disclosure being indicated by the following claims.

It is to be understood that the present disclosure is not limited to the precise structure described above and shown in the accompanying drawings, and that various modifications and changes may be made without departing from the scope thereof. The scope of the present disclosure is limited only by the appended claims.

The foregoing disclosure is merely illustrative of preferred embodiments of the present disclosure but not intended to limit the present disclosure, and any modifications, equivalent substitutions, adaptations thereof made within the spirit and principles of the disclosure shall be encompassed in the scope of protection of the present disclosure.

What is claimed is:

1. An interactive projection input and output device, comprising:
   a projecting module, configured to display a screen mirroring content from an external device in a projection region of a projection picture corresponding to the external device;
   a coordinated operation capturing module, configured to:
      form a coordinated operation capture scope corresponding to the projection region;
      establish a first coordinate system within the coordinated operation capture scope;
      capture a user coordinated operation behavior occurring within the coordinated operation capture scope; and
      determine a first coordinate of a user coordinated operation point corresponding to the user coordinated operation behavior in the first coordinate system;
   a coordinated instruction generating module, configured to:
      obtain a relative position relationship between the user coordinated operation point and the projection region according to the first coordinate of the user coordinated operation point and regional position information of the projection region in the first coordinate system; and
      generate a position information instruction according to the relative position relationship; and
   a wireless transmission module, configured to:
      receive screen mirroring information from the external device through a downlink wireless connection, wherein the screen mirroring information comprises the screen mirroring content; and,
      send the position information instruction to the external device through an uplink wireless connection, such that an operating system of the external device calls an underlying drive program to execute the position information instruction, so as to achieve a control operation in response to the user coordinated operation behavior and thus operate the external device,
   the screen mirroring information further comprises an operating system type of the external device, and at least one of picture vertex coordinates or a screen resolution of the external device; wherein,
   the picture vertex coordinates or the screen resolution is used to instruct the coordinated instruction generating module to:
      generate a second coordinate of a virtual coordinated operation point to be displayed by the external device according to the picture vertex coordinates or the screen resolution, and the relative position relationship, such that the relative position relationship is satisfied between the virtual coordinated operation point and a screen of the external device; and
      generate the position information instruction identifiable by an operating system of the external device and for performing the control operation at the virtual coordinated operation point according to the second coordinate,
   the operating system type is used to instruct the coordinated instruction generating module to generate the position information instruction matched with the operating system type according to the relative position relationship.

2. The device of claim 1, wherein the projecting module comprises:
   a projection function assembly, configured to project the screen mirroring content; and
   a projection controller, configured to:
      adjust a position, an angle and/or a size of the projection region in response to receiving a projection adjustment instruction from the coordinated instruction generating module; and
      perform spectral correction favorable for protection of eye sight according to optical electronic information contained in the screen mirroring content.

3. The device of claim 1, wherein the coordinated operation capturing module comprises a coordinated operation detector which is disposed to form the coordinated operation capture scope corresponding to the projection region, and the coordinated operation detector is configured to:
   capture the user coordinated operation behavior occurring within the coordinated operation capture scope according to detected environmental physical signals;
   determine the first coordinate of the user coordinated operation point corresponding to the user coordinated operation behavior in the first coordinate system; and
   identify and capture the regional position information of the projection region in the first coordinate system.

4. The device of claim 1, wherein the coordinated operation capturing module comprises:
   a detection signal generator, configured to form the coordinated operation capture scope corresponding to the projection region by sending detection signals; and a coordinated operation detector, configured to:
- capture the user coordinated operation behavior occurring within the coordinated operation capture scope by detecting the detection signals;
- determine the first coordinate of the user coordinated operation point corresponding to the user coordinated operation behavior in the first coordinate system; and
- identify and capture the regional position information of the projection region in the first coordinate system.

5. The device of claim 1, wherein the coordinated instruction generating module comprises an application specific integrated circuit chip having a hardware computing circuit formed thereon by burning.

6. The device of claim 1, wherein the screen mirroring information further comprises at least one of an eccentric distance, a horizontal and vertical screen orientation, a data rate, or a frame rate; wherein,
- the horizontal and vertical screen orientation is used to instruct the coordinated instruction generating module to adjust the relative position relationship;
- the data rate and the frame rate are used jointly to calculate the screen resolution and the horizontal and vertical screen orientation;
- the eccentric distance is used to correct the second coordinate of the virtual coordinated operation point.

7. The device of claim 1, wherein,
the external device is plural in number,
the projecting module is specifically configured to respectively project screen mirroring contents from a plurality of external devices to projection regions of the projection picture corresponding to the plurality of external devices;
the coordinated instruction generating module is specifically configured to:
- determine a specific projection region where the user coordinated operation point is located, according to the first coordinate of the user coordinated operation point and regional position information of each of the projection regions in the first coordinate system; and
- generate a position information instruction for a specific external device corresponding to the specific projection region according to the relative position relationship between the user coordinated operation point and the specific projection region;
the wireless transmission module is specifically configured to, through wireless connections respectively established with the plurality of external devices,
- receive screen mirroring information of the plurality of external devices, wherein the screen mirroring information comprises the screen mirroring contents; and
- send the position information instruction for the specific external device from the coordinated instruction generating module to the specific external device.

8. The device of claim 7, wherein in response to identifying a gesture operation corresponding to a file sharing function, the coordinated instruction generating module is further configured to:
- determine an external device as a sharing end and position information of a shared file to be displayed in the external device as the sharing end, based on a start point of the gesture operation,
- determine an external device as a receiving end based on a swipe direction or endpoint of the gesture operation, and
- generate a file sharing position information instruction, wherein the file sharing position information instruction is used to share the shared file from the external device as the sharing end to the external device as the receiving end.

9. The device of claim 8, wherein the wireless transmission module is further configured to:
- send the file sharing position information instruction to the external device as the sharing end, such that the external device as the sharing end sends the shared file to the external device as the receiving end through a wireless connection established with the external device as the receiving end.

10. The device of claim 8, wherein the wireless transmission module is further configured to:
- send the file sharing position information instruction to the external device as the sharing end to cause the external device as the sharing end to send the shared file to the wireless transmission module through a wireless connection established with the wireless transmission module, such that the wireless transmission module sends the shared file to the external device as the receiving end through a wireless connection established with the external device as the receiving end.

11. The device of claim 1, wherein the downlink wireless connection established by the wireless transmission module with the external device comprises one or more of router, Bluetooth, NFC, UWB, ZigBee, LiFi, WiFi, NB-IoT, eMTC, LoRa, tuner, GNSS, LNB, cellular 3G, cellular 4G, cellular 5G, cellular 6G, or its own wireless hotspot.

12. The device of claim 1, wherein the uplink wireless connection established by the wireless transmission module with the external device comprises one or more of Bluetooth, BLE, NFC, router, WiFi, NB-IoT, eMTC, LoRa, tuner, GNSS, LNB, Z-Wave, cellular 3G, cellular 4G, cellular 5G, cellular 6G or wireless USB.

13. The device of claim 1, further comprising:
- a camera module, configured to acquire image information; and
- an audio module, configured to acquire audio information and play audio information received by the wireless transmission module from the external device.

14. The device of claim 1, wherein,
the projecting module comprises an eye sight protection filter, and
the eye sight protection filter comprises an eye sight protection filter lens or an eye sight protection filter film to reduce density of high energy blue light and/or stroboscopic effect harmful to eye sight.

15. The device of claim 1, wherein the device is integrated into glasses; and
the projecting module is configured to project the projection picture to retinas of human eyes or to lenses of the glasses or to air.

* * * * *